June 10, 1930.  W. F. MECUM  1,762,402
WELDING DEVICE
Filed March 27, 1929
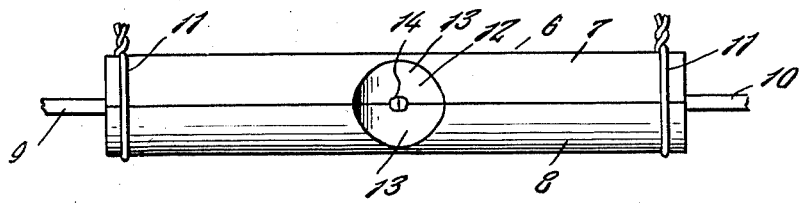
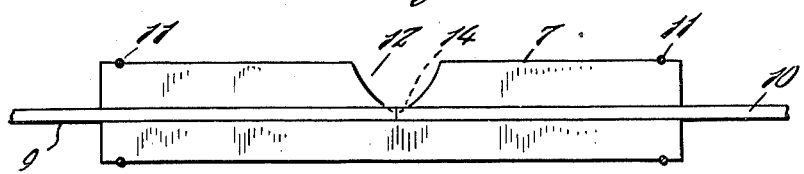
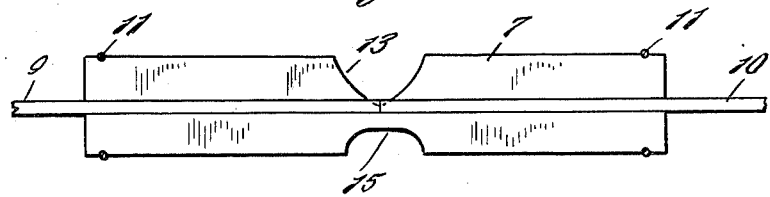
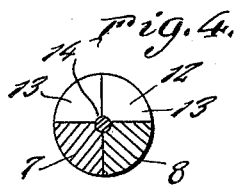
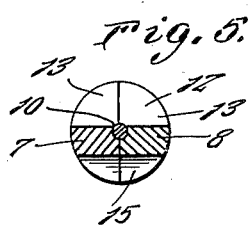
Inventor
William F. Mecum
By Clarence A. O'Brien
Attorney Patented June 10, 1930

1,762,402

UNITED STATES PATENT OFFICE

WILLIAM F. MECUM, OF DOUGLAS, WYOMING

WELDING DEVICE

Application filed March 27, 1929. Serial No. 350,247.

This invention relates to a device which is especially but not necessarily designed to aid in welding together the ends of copper wire.

It is a matter of common knowledge that difficulty and inconvenience is encountered in effectively welding together the ends of the copper wires used as electricity conductors or for other purposes. The melting point of copper is such as to add decisively to the welding task, for when intense heat is applied, at the abutting ends of the wire, the metal fuses so rapidly that a durable connection can not be readily or easily obtained.

I have therefore produced a temporary wire end connector or coupling, expressly made for ready application to the wire ends to hold them in assembled abutting relation until the weld has been made.

In carrying out the invention I have evolved and produced a simple and inexpensive appliance such as permits effective heating of the wire ends, the same being characterized by a structural arrangement which permits clear vision of said wire ends so that the moment the desired fusing takes place, the force of heat may be removed to prevent overheating and a boiling like mass melting of the copper.

The specific structure for accomplishing these advantages will become more readily apparent from the following description and drawings.

In the drawings:

Figure 1 is a top plan view of the complete device.

Figure 2 is a longitudinal elevational view showing one section of the device.

Figure 3 is a view like Figure 2, showing a slight modification in construction.

Figure 4 is a central cross sectional view through Figure 1.

Figure 5 is a view like Figure 4, with a section taken through that embodiment of the device seen in Figure 3.

Referring now to the drawings by reference numerals, it will be observed that the device is generally designated by the reference character 6. It is in the form of a tubular wire end coupling or connector. It is made up of a pair of duplicate half sections 7 and 8, composed of appropriate refractory material, such as fire clay or welding carbon paste.

The coupling is made in sections to facilitate placement or assembly against and around the opposite end portions of the copper wire. In the drawings, I show two lengths of wire, one being designated at 9 and the other at 10 and the ends of course come together in abutting relation as represented.

These clamping sections are maintained in assembled relation by any suitable means. In the drawings, I show bracing and retaining wires 11. It is understood, however, that any suitable clamping devices may be employed.

As seen in Figure 1, the reference character 12 designates a recess, formed by complemental notches 13 and constituting a flame concentration pocket. The reference character 14 designates an aperture forming a sight opening to expose the abutting ends of the wire. It is obvious that the heat, which may be from any source, but which is preferably a welding torch is applied to the pocket 12 and directly against the abutting end of the wire. Through the medium of the sight opening 14, the user may see when the fusing takes place, and thereby immediately remove the source of heat to prevent overmelting. Thus the clamp holds the wire ends in assembled relation until the weld is made and is an insulator to prevent overheating of the portions of the wire adjacent the abutting ends.

The only difference between that form of the invention seen in Figures 1, 2, and 4, and the form seen in Figures 3 and 5 is that the coupling sections 7 and 8 are formed with notches 15, which cooperate with a sort of preheating pocket. Thus the heat is first applied to this pocket to preheat the ends of the wire and is then directed against the diametrically opposite pocket 12 to finish the job.

The gist of the invention is in the provision of a refractory coupling or form to hold the wire ends in assembled relation, to heat through these ends, and to permit clear vision to determine when to remove the source of heat. As before stated, the force of heat may be varied according to circumstances, and it is a really immaterial factor so far as the novelty of this invention is concerned.

From the foregoing description and drawings it will be seen that I have developed an especially useful contribution to the art, which, it is believed is an achievement beyond prior known devices. In fact, I know of no device which so expedites and facilitates the joining and welding of wire ends, especially copper to facilitate this work and to be usable over and over again for sake of economy and efficiency.

It is thought, however, that persons skilled in the art will be able to obtain a clear understanding of the construction and features and advantages from the disclosure so far made. Therefore, a more lengthy description is regarded as unnecessary.

Minor changes in the shape, size, materials, and rearrangement of features coming within the field of invention claimed may be resorted to, in actual practice, if desired.

I claim:

1. A wire welding device of the character described comprising a pair of complementary sections adapted to be disposed in opposed relation to each other and having grooves in their opposed sides for the reception of the wires and further a pocket formed in their intermediate portions communicating with the grooves in a manner to expose the adjacent ends of the wires, said pocket constituting means for concentrating heat on the exposed portions of the wires.

2. A wire welding device of the character described comprising a pair of elongated complementary half sections adapted to be disposed in opposed relation to each other and having longitudinal grooves in their opposed sides for the reception of the wires in end abutting relation, said half sections being further provided with intermediate, transverely aligned, complemental recesses in one side communicating with the longitudinal grooves in a manner to expose the adjacent end portions of the wires, said complemental recesses constituting a pocket for concentrating heat on the exposed end portions of the wires.

3. A wire welding device of the character described comprising a pair of elongated complementary half sections of substantially semi-circular cross-section adapted to be disposed in parallel, opposed side abutting relation to each other and having complementary longitudinally extending grooves in their opposed sides for the reception of the end portions of the wires in end abutting relation, said half sections being further provided with intermediate transversely aligned complemental recesses in one side thereof communicating with the grooves in a manner to expose the adjacent end portions of the wires, the walls of said complemental recesses converging inwardly, said recess constituting pockets for concentrating heat on the exposed end portions of the wires.

4. A wire welding device of the character described comprising a pair of elongated complementary half sections of substantially semi-circular cross-section adapted to be disposed in parallel, opposed side abutting relation to each other and having complementary longitudinally extending grooves in their opposed sides for the reception of the end portions of the wires in end abutting relation, said half sections being further provided with intermediate transversely aligned complemental recesses in one side thereof communicating with the grooves in a manner to expose the adjacent end portions of the wires, the walls of said complemental recesses converging inwardly, said recess constituting pockets for concentrating heat to the exposed end portions of the wires, said half sections being further provided with transversely aligned complemental recesses on the diametrically opposite sides thereof from the heat concentrating pockets and terminating in spaced relation to the longitudinal grooves and constituting means to facilitate the preheating of the abutting ends of the wires.

5. A wire welding device of the character described comprising a pair of elongated complementary half sections of substantially semi-circular cross-section adapted to be disposed in parallel, opposed side abutting relation to each other and having complementary longitudinally extending grooves in their opposed sides for the reception of the end portions of the wires in end abutting relation, said half sections being further provided with intermediate transversely aligned complemental recesses in one side thereof communicating with the grooves in a manner to expose the adjacent end portions of the wires, the walls of said complemental recesses converging inwardly, said recess constituting pockets for concentrating heat to the exposed end portions of the wires, said half sections being further provided with transversely aligned complemental recesses on the diametrically opposite sides thereof from the heat concentrating pockets and terminating in spaced relation to the longitudinal grooves and constituting means to facilitate the preheating of the abutting ends of the wires, and means for detachably securing the half sections together in a manner to clamp the end portions of the wires therebetween.

In testimony whereof I affix my signature.

WILLIAM F. MECUM.